United States Patent [19]
Tabata

[11] 4,015,892
[45] Apr. 5, 1977

[54] OPTICAL SCANNING SYSTEM FOR SLITWISE EXPOSURE

[75] Inventor: Yasuhiro Tabata, Kawasaki, Japan

[73] Assignee: Ricoh Co., Ltd., Japan

[22] Filed: Mar. 15, 1976

[21] Appl. No.: 667,140

[30] Foreign Application Priority Data

Mar. 17, 1975 Japan .............................. 50-32013

[52] U.S. Cl. ...................................... 350/6; 355/66
[51] Int. Cl.² .......................................... G02B 27/17
[58] Field of Search .................. 350/6, 7, 107, 113, 350/115, 241, 271, 289; 355/66, 4, 50

[56] References Cited
UNITED STATES PATENTS 3,841,753  10/1974  Ogawa ................................. 355/66

Primary Examiner—John K. Corbin
Assistant Examiner—Ben W. de los Reyes
Attorney, Agent, or Firm—McGlew and Tuttle

[57] ABSTRACT

The optical system is adapted for use in a copying machine. At least three reflecting mirrors are used for slitwise scanning and successively reflecting an image of a material, to be copied, placed on a stationary transparent pane, onto a stationary focusing lens. The intermediate or second mirror is disposed stationary adjacent to one of the opposite ends of the pane, whereas the first and third mirrors are moved along respective paths at respective rates in a predetermined relation but in respective directions of movement. This arrangement permits the movable mirrors to effect their functions without overrunning the limits defined by the opposite ends of the pane, thereby resulting in a compact or reduced size construction of the machine.

7 Claims, 8 Drawing Figures

OPTICAL SCANNING SYSTEM FOR SLITWISE EXPOSURE

BACKGROUND OF THE INVENTION

The invention relates to an optical system for slitwise exposure which is adapted for use in a copying machine.

A conventional optical system for slitwise exposure which is used in an electrostatic copying machine may comprise an arrangement as shown in FIG. 1 in which an original is placed on an original receptacle which comprises a transparent glass pane 2. A first mirror M1 is moved in the direction of an arrow $a$, and a second mirror M2 is moved in the same direction with one-half the speed of the first mirror M1, with an exposure radiation from the first mirror M1 being introduced through an inmirror lens M$l$ onto a photosensitive sheet or a photosensitiive drum. Alternatively, FIG. 2 shows an arrangement in which the first mirror M1 is moved in the direction of the arrow $a$ parallel to the original receptacle 2 with a speed V as before, and the second mirror M2 is moved in a direction indicated by an arrow $b$, which is parallel to the path of the flux exiting therefrom, with a speed of ½V sec $\theta$ ($\theta$ being the angle of reflection of the emitting flux), with the flux from the second mirror M2 being introduced through an in-mirror lens onto a photosensitive drum.

A copying machine which employs an optical system of the movable mirror type for slitwise exposure has a physical size which is determined principally by the extent of the movement of the optical system. Where the original receptacle is stationary, the size of the original receptacle will determine the minimum achievable size for the top of the copying machine, which can be attained by arranging the slitwise exposure system such that its extent of movement does not extend beyond the space occupied by the original receptacle 2. To this end, an arrangement must be made such that the second mirror M2 moves into coincidence with the position of the first mirror M1 or short thereof when the first mirror M1 has moved to the end of the original receptacle 2. With the conventional optical system mentioned above, the scanning flux from the first mirror M1 cannot be passed to the in-mirror lens M$l$ unless the second mirror M2 maintains a position which is forwardly of the first mirror M1 during the scanning of the original, so that, in the arrangement shown in FIG. 1 or FIG. 2, when the first mirror M1 moves from a starting end of the original receptacle 2 (shown in solid line) to its terminal end (shown in broken lines) through a distance $l$ in order to complete a scanning of the original 1, the second mirror M2 will assume a position (shown in broken lines) which is displaced by a distance $\Delta l$ from the terminal end of the original receptacle 2. As a consequence, the extent of movement of the optical system exceeds the space occupied by the original receptacle 2, so that a copying machine incorporating such an optical system will have to be made oblong in the transverse dimension, resulting in a relatively bulky structure.

SUMMARY OF THE INVENTION

In view of the foregoing, it is an object of the invention to provide a compact optical system for slitwise exposure which has its extent of movement limited within the space defined by an original receptacle.

DETAILED DESCRIPTION OF THE PREFERRED EMBODIMENTS OF THE INVENTION

Figure 1:
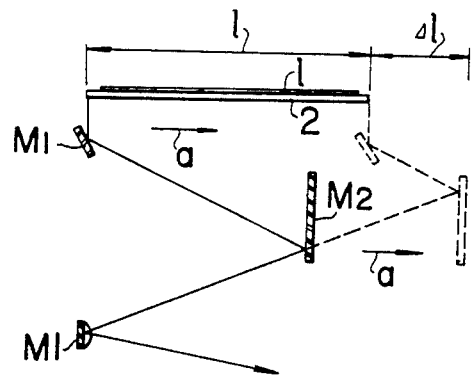
FIGS. 1 and 2 are schematic views illustrating conventional optical systems for slitwise exposure in a copying machine.
Figure 2:
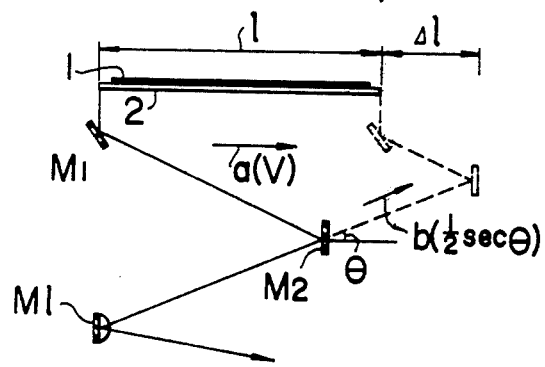
Figure 3:
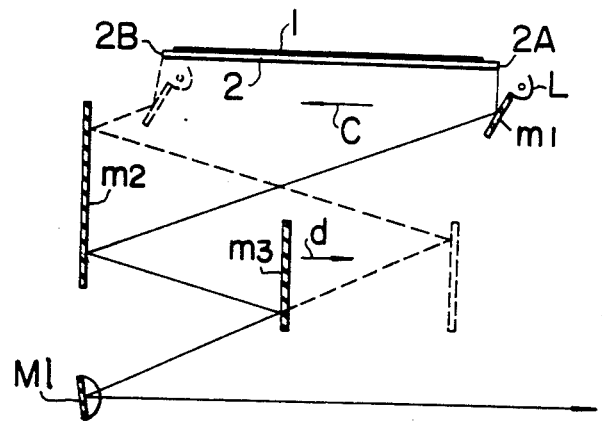
FIG. 3 is a schematic side elevation of one embodiment of the invention.

Referring to FIG. 3, the optical system for slitwise exposure according to the invention comprises a first mirror $m1$ which is adapted to move, together with an exposure lamp L, in the direction of an arrow $c$, parallel to the original receptacle 2, from its starting end 2A to its terminal end 2B, thereby scanning the original 1. The scanning flux impinges on a second mirror $m2$ which is fixedly mounted adjacent to one end of the original receptacle 2 substantially in a vertical orientation, and which reflects the incident flux to a third mirror $m3$. The third mirror is adapted to be moved in the direction of an arrow $d$, thus in the opposite direction from the mirror $m1$, with one-half the speed of movement of the first mirror $m1$. The flux from the third mirror $m3$ is passed through an in-mirror lens M$l$ onto a photosensitive drum or the like in a conventional manner.

Figure 4:
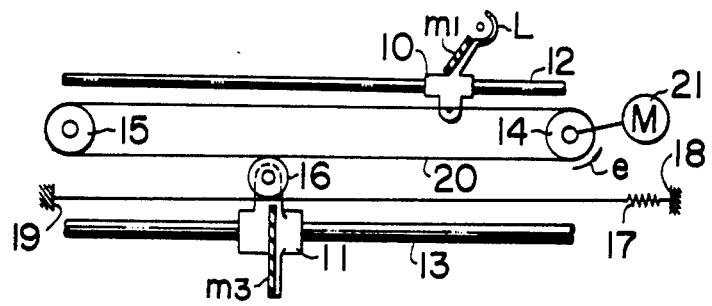
FIG. 4 is a side elevation of a drive mechanism used in the embodiment shown in FIG. 3.

FIG. 4 shows one example of a drive mechanism for driving the first mirror $m1$ and the third mirror $m3$ of the optical system. Specifically, the first mirror $m1$ is fixedly mounted on a first mirror support 10 together with the exposure lamp L, while the third mirror $m3$ is fixedly mounted on a third mirror support 11. The supports are loosely fitted on respective pairs of parallel guide rails 12, 13 so as to be slidable along these rails. A pair of pulleys 14, 15 are rotatably mounted at fixed positions adjacent to the respective ends of the guide rails 12, and a movable pulley 16 is rotatably mounted on the third mirror support 11. The pulley 16 is engaged by a wire 20 which has its one end secured to a stationary member 18 through a spring 17 and has its other end secured to another stationary member 19. The wire 20 extends from the member 19 around part of the periphery of the pulley 16, around the pulley 15 and then around the pulley 14, and passes around the periphery of the pulley 16 again before being tied to the spring 17. The first mirror support 10 is secured to the upper run of the endless wire 20 which extends around the pair of pulleys 14, 15. The pulley 14 is driven for rotation in the direction indicated by an arrow $e$ by a reversible drive motor 21, thus moving the first mirror $m1$ and the third mirror $m3$ in respective opposite directions.

Figure 5:
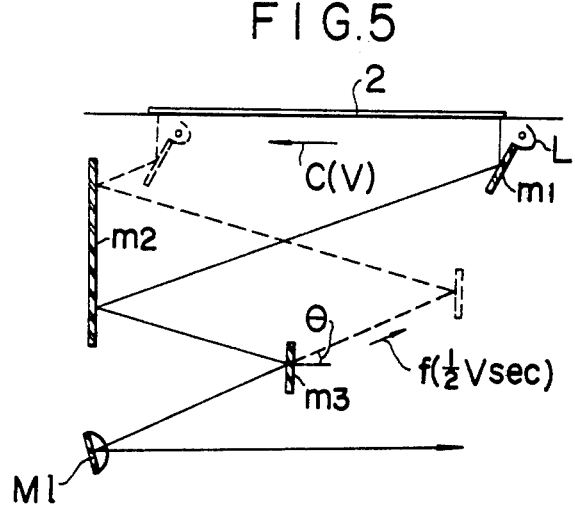
FIG. 5 is a schematic side elevation of another embodiment of the invention.

FIG. 5 shows another embodiment of the invention in which the first mirror $m1$ and the second mirror $m2$ of the optical system are disposed as mentioned above in connection with FIG. 3, and the first mirror $m1$ is moved in the direction of the arrow $c$ with a speed V while the third mirror $m3$ is moved in the direction indicated by an arrow $f$, parallel to the path of the exiting flux therefrom, with a speed of ½V sec Θ (Θ being the angle of reflection of the exiting flux) so that the flux from the third mirror $m3$ may be passed through the in-mirror lens $Ml$ onto a photosensitive drum or like member.

Figure 6:
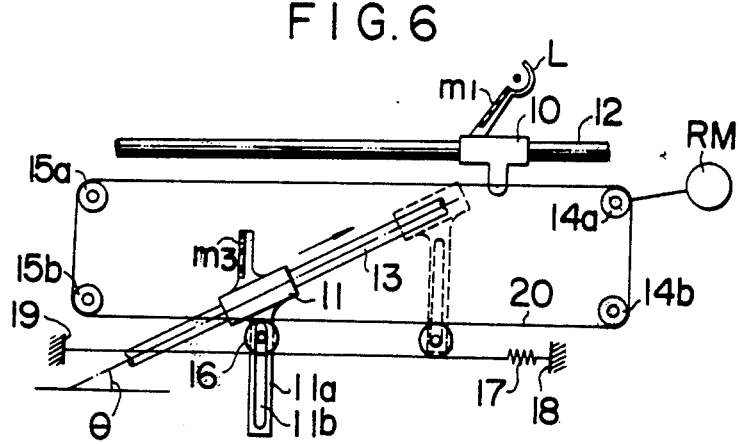
FIG. 6 is a side elevation of a drive mechanism used in the embodiment shown in FIG. 5.

FIG. 6 shows an example of a drive mechanism for the first and third mirrors $m1$, $m3$ of the optical system shown in FIG. 5. As before, the first mirror $m1$ is secured to the first mirror support 10 together with the exposure lamp L, and the third mirror $m3$ is secured to the third mirror support 11. The first mirror support 10 is slidably mounted on the guide rail 12 while the third mirror support 11 is slidably mounted on the guide rail 13 which forms an angle Θ relative to the guide rail 12 and extends parallel to the exiting optical path from the third mirror. Two pairs of the stationary pulleys 14a, 14b; 15a, 15b are rotatably mounted in the vicinity of the respective ends of the guide rail 12. The third mirror support 11 includes an arm 11a in which is formed with an elongate slot 11b pivotally carrying a movable pulley 16 which is slidable therealong. A wire 20 has its one end secured to a stationary member 19 and extends around the pulley 16, the pairs of pulleys 14a, 14b, 15a, 15b and around the periphery of the pully 16 before being tied to one end of a spring 17, the other end of which is anchored to a stationary member 18. As before, the pulley 14a is driven by the reversible drive motor 21, whereby the first mirror $m1$ and the third mirror $m3$ are driven in respective opposite directions.

Figure 7:
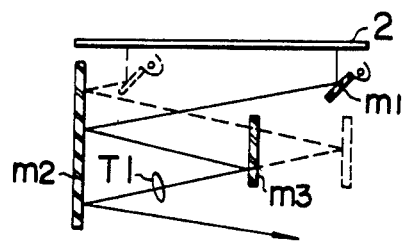
FIGS. 7 and 8 are schematic side elevations illustrating further embodiments of the invention.
Figure 8:
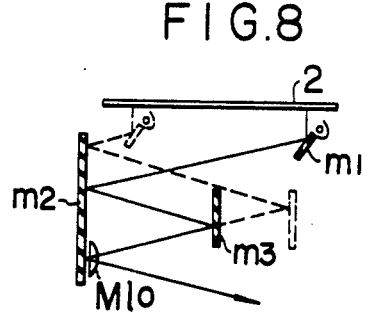

In each of the above embodiments, the in-mirror lens $Ml$, which serves as means for focussing a scanned image of the original onto the surface of a photosensitve drum, may be replaced by a through-lens $Tl$ disposed on the optical path from the third mirror $m3$ to a lower part of the second mirror $m2$, as shown in FIG. 7, or by an in-mirror lens $Ml_0$, part of which is formed by the second mirror $m2$ as shown in FIG. 8.

With the optical system for slitwise exposure according to the invention, the direction of the movement of the first mirror can be made opposite from the direction of movement of the third mirror, so that these mirrors can be disposed separately with an increased freedom of choice so as to maintain the extent of movement of the third mirror within the space occupied by the original receptacle, thus enabling the provision of a copying machine of a reduced size.

It should be understood that the optical system according to the invention can be constructed so that a scanned image is subjected to an even number of reflections by the mirrors to form a true image or is subjected to an odd number of reflections to form a mirror image. The optical path of the scanned image will increase as the number of mirrors increases, but does not influence the size of the copying machine since the original receptacle of a copying machine is usually located at an elevation of around one meter, thereby providing accommodation for such an optical path.

What is claimed is:

1. An optically scanning apparatus comprising;
   a. means for maintaining a material to be scanned stationarily within a predetermined area in a plane,
   b. means for lighting the material,
   c. first reflector means movable between opposite ends of said predetermined area along a fixed path parallel to said plane at a rate for reflecting a light flux from successive slitwise areas of an image of said material,
   d. second reflector means disposed stationary adjacent to one of said area ends for reflecting the flux reflected by said first reflector means,
   e. third reflector means movable along a fixed path at a rate having a component, in a direction parallel to said plane, which is proportional to the rate of movement of said first reflector means but reverse in direction of movement, for reflecting the flux reflected by said second reflector means,
   f. means focusing the flux reflected by said third reflector means, and
   g. means controlling the movements of said first and third reflector means.

2. An apparatus according to claim 1, wherein said component of rate is one half the rate of movement of said first reflector means.

3. An apparatus according to claim 1, further comprising fourth reflector means for reflecting the flux after passing through said focusing means.

4. An apparatus according to claim 3, wherein said second reflector means comprises a reflecting member and said fourth reflector means consists of a part of said member.

5. An apparatus according to claim 3, wherein said focusing means is formed in a built-in reflector construction so that it may also serve as the fourth reflector means.

6. An apparatus according to claim 1, wherein said controlling means comprises
   a. first support means movable along a first linear path for supporting said first reflector means,
   b. second support means movable along a second linear path for supporting said third reflector means,
   c. a pair of pulleys disposed stationary adjacent the respective ends of said first linear path,
   d. another pulley supported by said second support means,
   e. a wire having one end anchored to a stationary member adjacent one of the ends of said first and extending in a third linear path around, in sequence, said another pulley, said pair of pulleys, in succession, and then again around said another pulley the other end of said wire being anchored to another stationary member adjacent the other end of said first linear path, and
   f. means for applying tension to said wire.

7. An apparatus according to claim 6, wherein said second linear path forms an angle with respect to said first linear path and means supporting said another pulley for sliding motion on said second support means in a direction normal to the direction of said first linear path.

* * * * *